United States Patent
Bryngelsson et al.

(10) Patent No.: US 10,505,375 B2
(45) Date of Patent: Dec. 10, 2019

(54) METHOD FOR CONTROLLING AN ENERGY STORAGE SYSTEM

(71) Applicant: VOLVO TRUCK CORPORATION, Göteborg (SE)

(72) Inventors: Hanna Bryngelsson, Göteborg (SE); Niklas Legnedahl, Onsala (SE); Peter Ahlqvist, Mölnlycke (SE)

(73) Assignee: Volvo Truck Corporation, Göteborg (SE)

(*) Notice: Subject to any disclaimer, the term of this patent is extended or adjusted under 35 U.S.C. 154(b) by 189 days.

(21) Appl. No.: 14/898,333

(22) PCT Filed: Jun. 20, 2013

(86) PCT No.: PCT/EP2013/001818
§ 371 (c)(1),
(2) Date: Dec. 14, 2015

(87) PCT Pub. No.: WO2014/202102
PCT Pub. Date: Dec. 24, 2014

(65) Prior Publication Data
US 2016/0181838 A1   Jun. 23, 2016

(51) Int. Cl.
*H02J 7/00* (2006.01)
*H02J 7/04* (2006.01)
(Continued)

(52) U.S. Cl.
CPC .......... *H02J 7/0018* (2013.01); *B60L 58/13* (2019.02); *B60L 58/15* (2019.02); *B60L 58/22* (2019.02);
(Continued)

(58) Field of Classification Search
CPC .............................. H02J 7/0018; H02J 7/0021
See application file for complete search history.

(56) References Cited

U.S. PATENT DOCUMENTS

| 6,157,164 A | 12/2000 | Jaworski et al. |
| 2004/0138785 A1* | 7/2004 | Emori .................. H02J 7/0016 |
| | | 700/286 |

(Continued)

FOREIGN PATENT DOCUMENTS

| JP | H08019187 | 1/1996 |
| JP | 2008118790 | 5/2008 |

(Continued)

OTHER PUBLICATIONS

Avery, Introduction to PID control, Mar. 2009.*
(Continued)

*Primary Examiner* — Robert Grant
*Assistant Examiner* — Tynese V McDaniel
(74) *Attorney, Agent, or Firm* — WRB-IP LLP (57) ABSTRACT

A method is provided for controlling an energy storage system, the energy storage system including at least two battery modules electrically coupled in parallel to each other. The method includes receiving a signal indicative of a maximum power capability of each of the respective battery modules; assigning a power threshold limit for the at least two battery modules of the energy storage system corresponding to the lowest maximum power capability received from the battery modules; and providing a charge current to the at least two battery modules, the charge current having a current level being proportional to the power threshold limit.

9 Claims, 3 Drawing Sheets

(51) Int. Cl.
   *H02J 7/14*      (2006.01)
   *B60L 58/13*     (2019.01)
   *B60L 58/22*     (2019.01)
   *B60L 58/15*     (2019.01)

(52) U.S. Cl.
   CPC .......... *H02J 7/0014* (2013.01); *H02J 7/0021* (2013.01); *H02J 7/0022* (2013.01); *H02J 7/045* (2013.01); *H02J 7/1423* (2013.01); *B60L 2240/545* (2013.01); *B60L 2240/547* (2013.01); *B60L 2240/549* (2013.01); *H02J 7/0077* (2013.01); *H02J 2007/005* (2013.01); *H02J 2007/0096* (2013.01); *Y02T 10/7005* (2013.01); *Y02T 10/7044* (2013.01); *Y02T 10/7061* (2013.01)

(56) References Cited

U.S. PATENT DOCUMENTS

| | | |
|---|---|---|
| 2012/0119746 A1 | 5/2012 | Macris |
| 2012/0187909 A1* | 7/2012 | Nysen ................. H01M 10/425 320/118 |
| 2012/0326726 A1 | 12/2012 | Tabuchi et al. |
| 2013/0009605 A1* | 1/2013 | Hongo .................. H01M 4/505 320/134 |
| 2013/0342173 A1* | 12/2013 | Das ........................ H02J 7/045 320/162 |
| 2015/0048795 A1* | 2/2015 | Hashimoto ............. H02J 7/045 320/126 |

FOREIGN PATENT DOCUMENTS

| | | |
|---|---|---|
| JP | 2008283853 | 11/2008 |
| WO | 2013018693 A1 | 2/2013 |

OTHER PUBLICATIONS

International Search Report (dated Jul. 9, 2014) for corresponding Intenrational App. PCT/EP2013/001818.

Japanese Official Action (dated Apr. 28, 2017) for corresponding Japanese App. 2016-520287.

* cited by examiner

METHOD FOR CONTROLLING AN ENERGY STORAGE SYSTEM

BACKGROUND AND SUMMARY

The present invention relates to the field of energy storage systems, and in particular to a method for controlling an energy storage system having battery modules coupled in parallel, in order to optimize the power utilization of the battery modules. The invention also relates to a corresponding control unit adapted to control the energy storage system.

Within the field of battery systems, energy storage systems are frequently used in a wide variety of applications and fields of technology. In, for example, the automotive industry, energy storage systems may be used for propulsion of a vehicle as well as to provide electrical energy to various systems of the vehicle.

In order to increase the power capability of the energy storage system, a solution can be provided where two or more battery modules/battery packs of the energy storage systems are coupled in parallel to each other. Hereby, the individual battery modules can be easily connected to, or disconnected from, each other. Also, an increased total capability is provided in comparison to using only a single battery module/battery pack.

However, a problem with energy storage systems having parallel coupled battery modules is that the battery modules need to be in approximately the same physical state for optimal energy usage. It is however a common scenario that the battery modules/battery packs are not in the same physical state and as an example, if the parallel coupled battery modules are differently aged, i.e. one of the battery modules has been recently exchanged with a new and unused battery module, there will most likely be a difference in power capability between the differently aged battery modules, which in turn will result in a reduced charge capability and discharge capability for the oldest battery module. If, on the other hand, one of the battery modules has a higher temperature than the other battery modules of the same energy storage system, the resistance of the battery module having higher temperature will most likely be lower than the battery module having lower temperature. Hereby, there is a risk that the warmer battery module will receive a charge current which is higher than its capability.

There is hence a need for controlling charge and discharge capability for energy storage systems having battery modules coupled in parallel.

US 2012/0119746 present a solution wherein each of the storage cells, i.e. the batteries, is connected to a respective cell controller. The respective cell controllers are in turn connected to processing and control module for measuring and storing parameters for each of the cells, such as temperature, current and voltage. Hereby, the storage cells are controlled in order to increase the overall performance of the plurality of storage cells.

Although US 2012/0119746 present a solution for the above identified problem, the energy storage system in US 2012/0119746 is still in need of further improvements in terms of e.g. cost efficiency.

It is desirable to provide a method for controlling an energy storage system having improvements in relation to prior art solutions.

According to a first aspect of the present invention there is provided a method for controlling an energy storage system, the energy storage system comprises at least two battery modules electrically coupled in parallel to each other, wherein the method comprising the steps of receiving a signal indicative of a maximum power capability of each of the respective battery modules; assigning a power threshold limit for the at least two battery modules of the energy storage system corresponding to the lowest maximum power capability received from the battery modules; and providing a charge current to the at least two battery modules, the charge current having a current level being proportional to the power threshold limit.

The wording "power threshold limit" should in the following and throughout the entire description be interpreted as a power limit which is not exceeding the power limit of the battery module having lowest maximum power capability. Also, the power capability can be measured by means of power, current or voltage. Accordingly, the present invention should not be construed as limited to measuring only one of power, current or voltage. The skilled person knows that these variables are dependent on each other and receiving a value for one of the variables when measuring one of the other variables is just a manner of simple calculation.

Furthermore, the wording "battery module" should in the following and throughout the entire description be interpreted to also include battery packs, which in themselves may comprise one or more batteries. Still further, the wording "battery module" should be understood to also include a module which may comprise a plurality of battery packs. Accordingly, the wording "battery module" may be a single battery, a battery pack which comprises more than a single battery, as well as a module which comprises more than a single battery pack.

An advantage of the present invention is that the applied charge current is directly dependent on, and proportional to, the maximum power capability of the battery module having the lowest power capability. Hereby, the battery module having the lowest power capability sets the limit for the charge current which reduces the risk of providing a charge current being damageable to the battery module. Also, by providing a charge current as described above, there is no need to individually controlling all of the at least two battery modules, i.e. it is only the battery module with the lowest power capability that is controlled while the remaining battery modules of the energy storage system receive their charge current dependent on the battery module having the lowest power capability. Hereby, a cost efficient method is provided in comparison to the above described prior art solution, since there is no need of controlling each of the battery modules.

According to an example embodiment, the method may be further followed by the steps of measuring a battery charge level of the battery module having lowest maximum power capability; and adjusting the charge current for reducing a difference between the battery charge level of the battery module having the lowest maximum power capability and the power threshold limit.

Hereby, the battery module having the lowest, power capability may be utilized to its optimum limit. As an example, if one of the battery modules in the energy storage system is exchanged with a new one, the power capability of the older battery may be smaller in comparison to the new battery module. Also, the resistance of the older battery module may, most likely, be larger than the new battery module. Hereby, when the charge current, which level is being proportional to the power capability of the older battery module, is provided to the parallel coupled battery modules, the older battery may not receive power up to its maximum power capability. In order to utilize the older battery module optimally, the charge current is adjusted, i.e.

increased, such that the difference between charge current for the older battery module and the power threshold limit is reduced. Naturally, the remaining battery modules of the energy storage system, i.e. the battery modules having a larger maximum power capability than the older battery module, will also receive an increased charge current. Accordingly, the overall performance of the energy storage system will be increased.

According to another example, if one of the battery modules of the energy storage system has an increased temperature level in comparison to the remaining battery modules, i.e. it is warmer than the remaining battery modules; the resistance of the warmer battery module will most likely be lower in comparison to the remaining battery modules. When the charge current is applied there is hence a risk that the warmer battery module will receive a charge current which corresponds to a power level which is higher than its maximum power capability, i.e. the warmer battery module may receive more charge current than it can handle. This may, for example, result in the battery module being aged more rapidly. By adjusting the charge current, in this example to be lower than the originally provided charge current, will then provide for an increased operational lifetime of the warmer battery module, as well as to prevent that the temperature is increased even further. Also, the operational lifetime of the entire energy storage system may be increased.

According to an example embodiment, the step of adjusting the charge current may comprise the steps of iteratively receiving battery charge level information from the battery module having the lowest maximum power capability and adjusting the charge current until the difference between the battery charge level of the battery module having the lowest maximum power capability and the power threshold limit is within a predetermined limit value.

By iteratively receiving battery charge level of the battery module and adjusting the applied charge current based on the received battery charge level information enables the method to increase/decrease the charge current in small steps, i.e. "little by little". Hereby, the difference between the battery charge level of the battery module having the lowest maximum power capability and the power threshold limit can be made with further accuracy.

It should be readily understood that the predetermined limit value can be set differently depending on a desired precision of the described differences between the battery charge level of the battery module having the lowest maximum power capability and the power threshold limit. Naturally, different applications are in need of different precision and will therefore not be discussed further.

According to an example embodiment, the method may be further configured to receive battery parameter status for each of the at least two battery modules of the energy storage system, such as temperature, voltage, current, state-of-charge and state-of-health.

Hereby, it is further possible to predict how much the charge current should be adjusted, i.e. increased/decreased, in order to reduce the difference between the battery charge level of the battery module having the lowest maximum power capability and the power threshold limit According to an example embodiment, a memory unit may be connected to the energy storage system, the method may further comprise the step of providing information relating to battery parameter status and adjusted charge current to the memory unit. According to an example embodiment, the memory unit may be a PID-regulator.

Hereby, the memory unit stores the adjusted charge current as well as the various parameters of the battery modules. An advantage is that when the same, or approximately the same, scenario between the battery modules occur again it may be easier to adjust the charge current to a desired level, since the memory unit knows how much the charge current was previously adjusted. Such a scenario may, for example, be when a battery module is exchanged with a new one. The memory unit may then remember how much charge current that was applied when previously adjusting to a desired level when changing battery modules. Furthermore, a PID-regulator is well known and may hence be suitable to use.

According to a second aspect of the present invention there is provided a control unit for controlling an energy storage system, wherein the energy storage system is connected to a generator and comprises at least two battery modules electrically coupled in parallel to each other, each of the at least two battery modules is connected to a measurement unit configured to measure a battery charge level of the respective battery modules, wherein the control unit is adapted to receive a signal from each of the at least two battery modules, the signal being indicative of a maximum power capability of each of the respective battery modules; assign a power threshold limit for the at least two battery modules of the energy storage system corresponding to the lowest maximum power capability received from the battery modules; and control the generator to provide a charge current to the at least two battery modules, the charge current having a current level being proportional to the power threshold limit.

Effects and features of this second aspect are largely analogous to those described above in relation to the first aspect of the present invention.

According to an example embodiment, the control unit may be further configured to receive a measured battery charge level of the battery module having lowest maximum power capability; and adjust the charge current for reducing a difference between the battery charge level of the battery module having the lowest maximum power capability and the power threshold limit.

According to an example embodiment, the control unit may be further configured to monitor battery parameter status for each of the at least two battery modules of the energy storage system, such as temperature, voltage, current, state-of-charge and state-of-health.

According to an example embodiment, the control unit may be further configured to adjust the charge current dependent on the monitored battery parameter status.

According to an example embodiment, the control unit may further be connected to a memory unit, wherein the memory unit is connected to the energy storage system and is configured to receive and store information from each of the at least two battery modules relating to battery parameter status; and receive and store information from the control unit relating to adjustment of charge current provided to the at least two battery modules.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein.

DETAILED DESCRIPTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference characters refer to like elements throughout the description.

Figure 1:
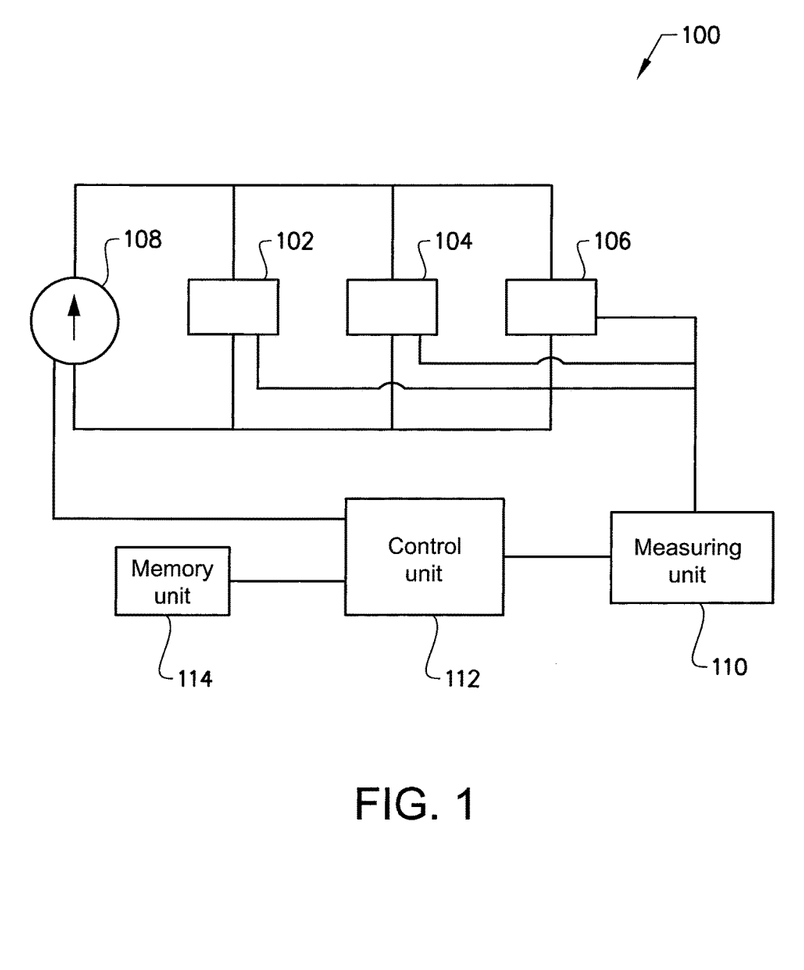
FIG. 1 is an example embodiment of an energy storage system according to the present invention.

Turning to FIG. 1, which illustrates an example embodiment of an energy storage system 100 according to the present invention. The energy storage system 100 depicted in FIG. 1 comprises a first 102, a second 104, and a third 106 battery module. The battery modules 102, 104, 106 are coupled in parallel to each other and are further connected to a generator 108 configured to generate electric current for charging the parallel coupled battery modules 102, 104, 106. The wording "battery module" should in the following and throughout the entire description be interpreted to include battery packs, which in themselves comprises one or more batteries. Still further, the wording "battery module" should be understood to also include a module which comprises a plurality of battery packs. Accordingly, the wording "battery module" may be a single battery, a battery pack which comprises more than a single battery, as well as a module which comprises more than a single battery pack.

Furthermore, the energy storage system 100 is connected to a measuring unit 110, a control unit 112 and a memory unit 114. Although FIG. 1 illustrates that each one of the battery modules 102, 104, 106 are coupled to the same measuring unit 110, control unit 112 and memory unit 114, the present invention is equally applicable having one measuring unit, one control unit and one memory unit provided for each of the respective battery modules 102, 104, 106. In such a case, the respective measuring unit 110, control unit 112 and memory unit 114 may be integrated in each of the battery modules 102, 104, 106. However, for simplicity of understanding, the following will describe the example embodiments in the figures by means of a single external measuring unit 110, control unit 112, and memory unit 114 for all of the battery modules 102, 104, 106.

Moreover, the measuring unit 110 is configured to measure a battery charge level as well as a maximum power capability for each of the battery modules 102, 104, 106. The maximum power capability is to be understood as the maximum power each of the respective battery modules are capable of handling. Hence, with the measuring unit 110 it is possible to receive information regarding the power capability of the battery modules as well as to continuously receive information regarding the charge level of the respective battery modules. Furthermore, the measuring unit 110 is configured to monitor battery parameter status for each of the battery modules 102, 104, 106, such as e.g. battery temperature, battery voltage, battery current, battery state-of-charge and battery state-of-health, etc.

Furthermore, the control unit 112 is connected to the measuring unit 110, the generator 108, and the memory unit 114. The control unit 112 is adapted to receive signals from the measuring unit 110 regarding the maximum power capability of each of the parallel coupled battery modules 102, 104, 106, as well as their respective battery charge level. Still further, the control unit 112 is also adapted to control the generator 108 such that the generator 108 provides the battery modules 102, 104, 106 with sufficient charge current. More precisely, the control unit 117 controls the generator 108 to provide a specific charge current to the battery modules 102, 104, 106 and also controls the generator 108 to adjust the charge current to be e.g. increased or decreased. This will be described further below in relation to the description of the method depicted in FIGS. 2 and 3.

Finally, the energy storage system 100 is, as described above, connected to a memory unit 114. More specifically, the memory unit 114 is connected to the energy storage system 100 via the control unit 112. The memory unit is however not limited to be connected to the control unit and can hence be connected directly to, for example, the battery modules as well, or to other control means of a vehicle. The memory unit 114 is configured to store, for example, battery parameter status measured by the measuring unit 110, adjusted charge current provided from the generator 108 to the battery modules 102, 104, 106, etc. Hereby, for a given state of the battery modules 102, 104, 106, the memory unit stores the charge current provided by the generator 108. Accordingly, the memory unit 114, which in one example embodiment is a PID-regulator, receives and stores more or less all possible information regarding the state of the battery modules 102, 104, 106 as well as commands given by control unit 112 for such battery module information.

Figure 2:
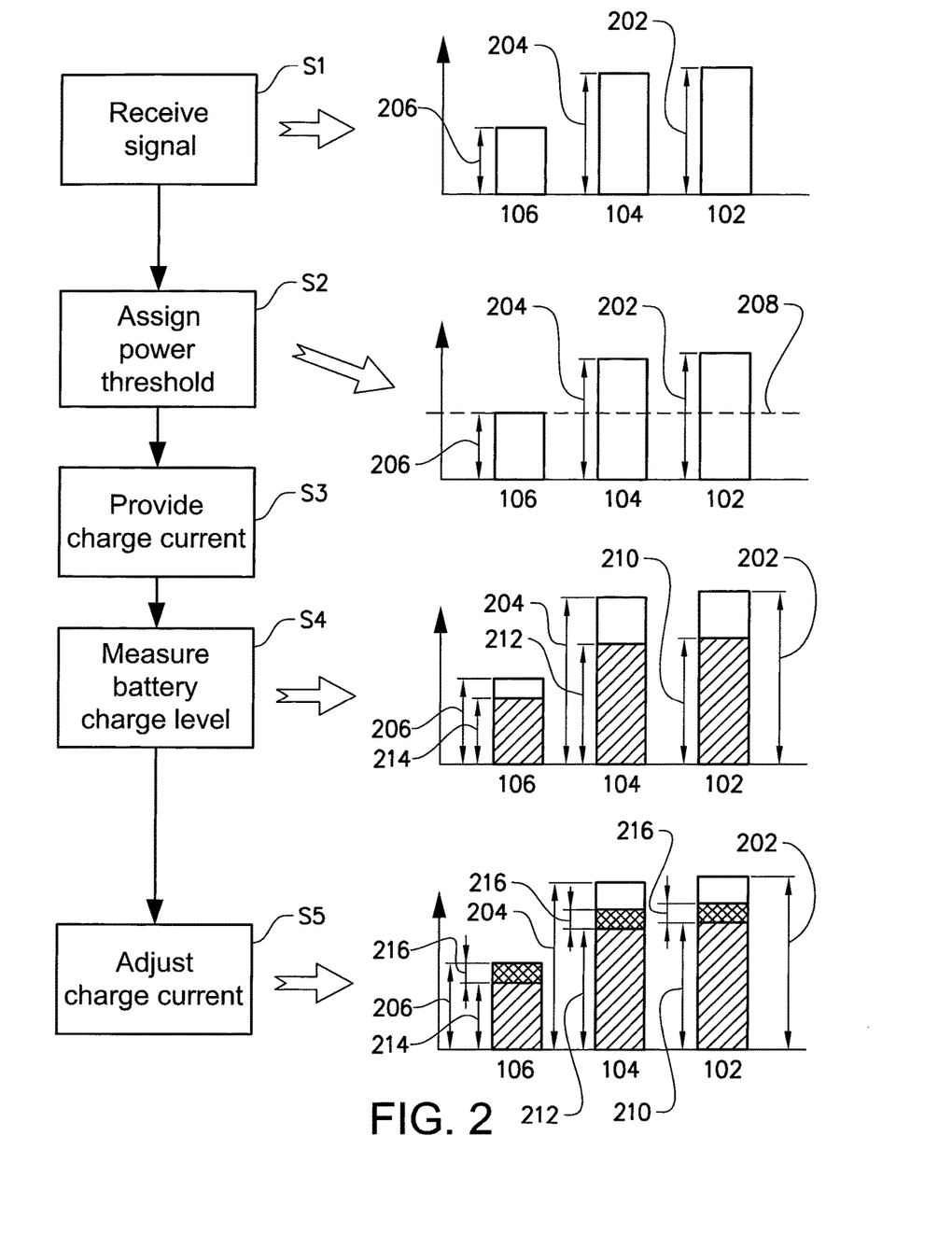
FIG. 2 illustrates a flow chart of an example embodiment of the method according to the present invention.
Figure 3:
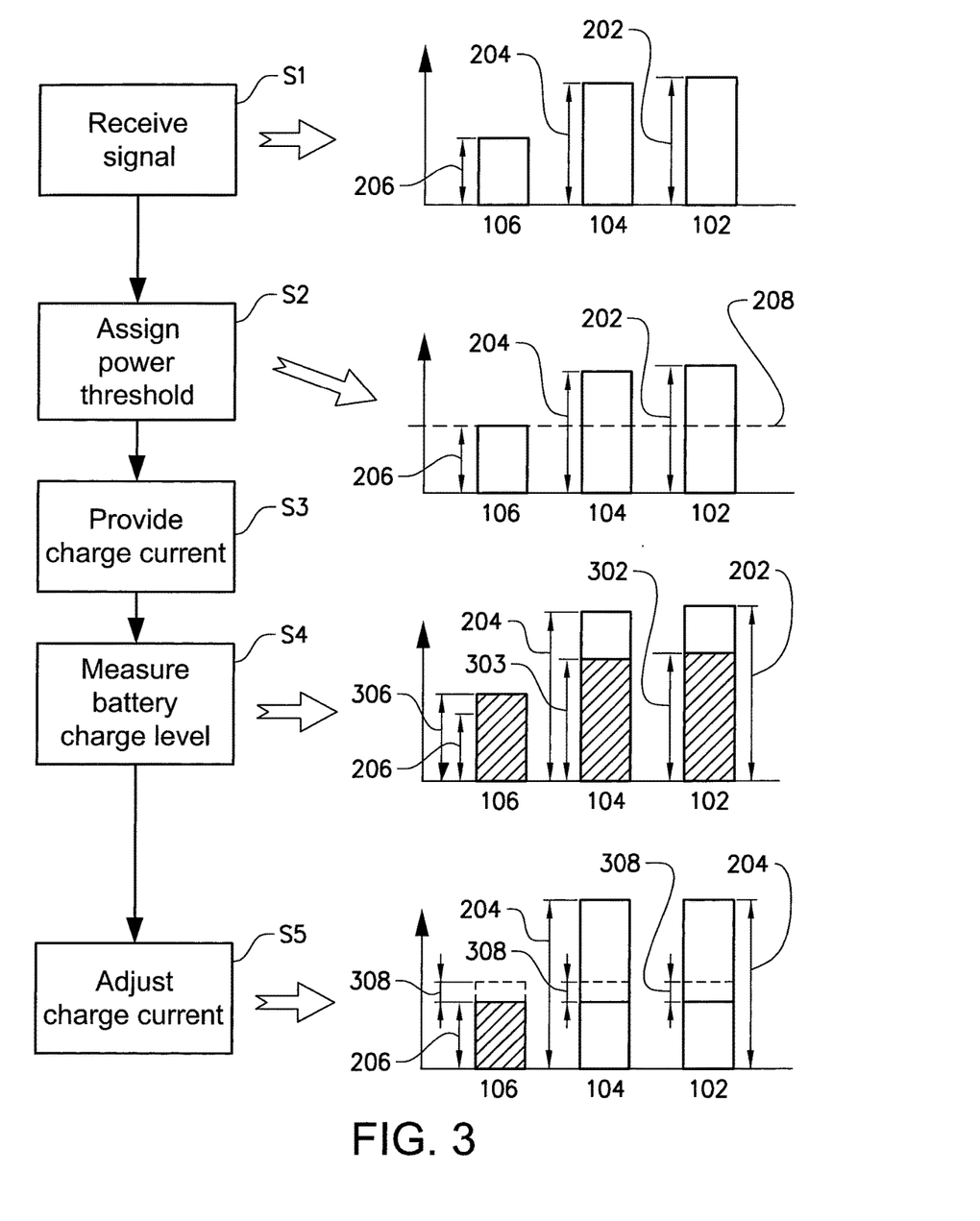
FIG. 3 illustrates a flow chart of a further example embodiment of the method according to the present invention.

Reference is now made to FIGS. 2 and 3 which illustrate two example embodiments of the method according to the present invention. Firstly, FIG. 2 illustrates an example where two of the above described battery modules 102, 104 have been recently replaced with new, unused, battery modules. Hence, the third battery module 106 is older than the newly exchanged first 102 and second 104 battery modules. Secondly, FIG. 3 illustrates an example where the third battery module 106 is exposed to increased temperature in comparison to the first 102 and the second 104 battery modules.

Turning now to FIG. 2, which illustrates a flow chart of an example embodiment of the method according to the present invention. As described above, the third battery module 106 is older than the first 102 and the second 104 battery modules.

Firstly, the method is initiated when the measuring unit 110 receives a signal S1 from each of the parallel coupled battery modules 102, 104, 106. The signal is indicative of a maximum power capability 202, 204, 206 for each of the respective battery modules 102, 104, 106. As depicted in the example embodiment illustrated in FIG. 2, the maximum power capability 202, 204 of the first 102 and the second 104 battery modules are approximately equal while the third battery module 106 having a lower maximum power capability 206. Since the third battery module has been operated for a longer period of time it is natural that the maximum power capability 206 of that battery module 106 is lower than the maximum power capability 202, 204 of the other newly exchanged battery modules 102, 104.

Now, in order to reduce the risk of providing too much power to the battery module 106 having the lowest maximum power capability, i.e. the power capability 206 of the third battery module 106, the control unit 112 assigns S2 a power threshold limit 208. The power threshold limit 208 is set not to exceed the power capability 206 of the third battery module 206. As an example, if the power capability 202 of the first battery module 102 is 50 W, the power capability 104 of the second battery module is 50 W and the power capability 206 of the third battery module 106 is 20 W, the power threshold limit will be set to 20 W.

Thereafter, the control unit 112 controls the generator 108 to provide S3 a charge current to the parallel coupled battery modules 102, 104, 106 of the energy storage system 100. In order not to exceed the maximum power capability 206 of the third battery module 106, the charge current provided from the generator 108 to the battery modules 102, 104, 106 is, in the example embodiment, preferably being set to be proportional to the above assigned power threshold limit 208. According to the above example, if the power threshold limit 208 is set to 20 W, the charge current provided to the battery modules 102, 104, 106 will be a charge current corresponding to a power level of 60 W, since there are three battery modules coupled in parallel.

When the charge current have been provided to the parallel coupled battery modules 102, 104, 106, the measuring unit 110 measures S4 the battery charge level 210, 212, 214 of each of the battery modules 102, 104, 106. Hence, measurement is made in order to determine how much power that is provided to each of the battery modules 102, 104, 106. Since, in the example embodiment, the third battery module 106 is older than the first 102 and the second 104 battery modules, the resistance of the third battery module 106 is higher than the resistance of the first 102 and the second 104 battery modules. Due to this higher resistance, the third battery module 106 may not receive a charge current that will provide maximum power for the third battery module 106. Accordingly, the third battery module 106 will be provided with power having a charge level 214 which is less than the power capability 206 of the battery module 106. The first 102 and the second 104 battery modules will naturally receive power having a power level 210, 212 below their respective maximum power capability 202, 204.

Finally, in order to increase the capability utilization of the third battery module 106, the charge current provided from the generator 108 to the parallel coupled battery modules 102, 104, 106 of the energy storage system 100 is adjusted S5. In the example embodiment, the charge current is increased with such an increased charge level 216 that a difference between the battery charge level, i.e. the charge level 214 plus the increased charge level 216, and the power threshold limit 208 is reduced to an acceptable power limit value. When increasing the charge current from the generator 108, the first 102 and the second 104 battery modules will also be provided with an increased charge level 216. It should be noted that since the resistance in the example embodiment is higher for the third battery module 106, the third battery module 106 may receive a lower charge current in comparison to the first 102 and the second 104 battery modules and the increased charge level 216 may hence not be equal for the respective battery modules 102, 104, 106.

According to the above described example, if the generator 108 provides 60 W to all of the parallel coupled battery modules 102, 104, 106, the first 102 and the second 104 battery module may, for example, each receive a charge current corresponding to a power level of 25 W, while the third battery module 106 receives a charge current corresponding to a power level of 10 W. Hereby, the third battery module 106 is not utilized to its full capability. Therefore, the charge current provided by the generator 108 can be increased for all of the battery modules 102, 104, 106 until the third battery module receives a charge current corresponding to a power level of approximately 20 W. This may result in that the generator will provide a charge current corresponding to a power level of e.g. 100 W, which will provide the first 102 and the second 104 battery modules with a charge level of 40 W each and the third battery module with a charge level of 20 W.

Hereby, the power capability of each of the battery modules 102, 104, 106, as well as the entire energy storage system, will be increased.

It should be noted that the steps of measuring S4 battery charge level for each of the battery modules 102, 104, 106 and adjusting S5 the charge current provided from the generator 108, i.e. to increase the charge current in the example embodiment of FIG. 2, can be made iteratively until the charge level of the third battery module 106 has been increased to a desired level.

Reference is now made to FIG. 3, which, as described above, illustrates an example of the present invention wherein the third battery module 106 is exposed to an increased temperature in comparison to the first 102 and the second 104 battery modules. Accordingly, the third battery module 106 is warmer than the remaining two battery modules 102, 104. The first three steps S1-S3 of the example in FIG. 3 are similar to those described above in relation to FIG. 2. The differences between FIG. 2 and FIG. 3 are the last two method steps, i.e. S4 and S5. Therefore, the following description will mainly focus on these two method steps S4, S5.

If a battery module is exposed to an increased temperature, the resistance of that battery module will most likely be reduced. Therefore, when providing S3 a charge current as described above, the battery module having an increased temperature, i.e. the third battery module 106 in the example embodiment, will receive a battery charge level corresponding to a power level being larger than the maximum power capability 206 of the third battery module 106. Accordingly, when measuring S4 the battery charge level 302, 304, 306, the battery charge level 306 of the third battery module may be higher than the maximum power capability 206 of the third battery module 106. As to the example above, if a charge current is provided by the generator 108 corresponding to a power level of 60 W, the first 102 and the second 104 battery modules may each receive a charge current corresponding to a power level of e.g. 15 W, while the third battery module receives a charge current corresponding to a power level of 30 W. This type of scenario may affect the third battery module negatively since its operational lifetime will most likely be reduced.

In order to optimize the operation lifetime of the battery modules, especially the operational lifetime of the third battery module 106, the charge current provided by the generator 108 is adjusted S5. More precisely, in the example embodiment depicted in FIG. 3, the generator provides a reduced charge level 308. Hereby, also the first 102 and the second 104 battery modules will be provided with a reduce charge level 308.

According to the above example, the charge current may be reduced to a level corresponding to e.g. 40 W, such that the first 102 and the second 104 battery modules may each receive a charge current corresponding to a power level of 10 W while the third battery module may receive a charge current corresponding to a power level of 20 W.

It should be noted that the steps of measuring S4 the battery charge level of each of the battery modules 102, 104, 106 and adjusting S5 the charge current provided from the generator 108, i.e. to reduce the charge current in the example embodiment of FIG. 3, can be made iteratively until the charge level of the third battery module 106 has been reduced to a desired level.

Moreover, although the description in relation to the examples depicted in FIGS. 2 and 3 relates to newly exchanged battery modules as well as a battery module being exposed to an increased temperature, the present invention is equally applicable for battery modules having e.g. different state-of-charge, state-of-health, etc.

Furthermore, all the steps described above in relation to FIGS. 2 and 3 can preferably be stored in the memory unit 114. Hereby, it can be determined at an earlier stage how much charge current that should be provided by the generator 108 when a scenario occurs that is stored in the memory unit 114.

It should be readily understood that the above described disclosure of specific embodiments of the present invention and the accompanying drawings are to be regarded as a non-limiting example of the invention and the scope of protection is defined by the appended claims. For example, the present invention is not limited to the use of three battery modules coupled in parallel. The energy storage system may of course comprise more, or less, battery modules. Any reference sign in the claims should not be construed as limiting the scope.

The invention claimed is:

1. A method for controlling an energy storage system, the energy storage system comprises at least two battery modules electrically coupled in parallel to each other, the method comprising the steps of:
   receiving a signal indicative of a maximum power capability of each of the respective battery modules;
   assigning a power threshold limit for the at least two battery modules of the energy storage system corresponding to the lowest maximum power capability received from the battery modules;
   providing a charge current to the at least two battery modules, the charge current having a current level being proportional to the power threshold limit; and
   after providing the charge current:
      measuring a battery power level of the battery module having lowest maximum power capability;
      increasing the charge current of each of the at least two battery modules of the energy storage system until a difference between the battery power level of the battery module having the lowest maximum power capability and the power threshold limit is within a predetermined limit after determining that a battery power level is below the power threshold limit; and
      discharging the battery charge level of each of the at least two battery modules of the energy storage system until a difference between the battery power level of the battery module having the lowest maximum power capability and the power threshold limit is within a second predetermined limit after determining that the battery power level is above the power threshold limit.

2. The method according to claim 1, wherein the step of adjusting the charge current comprises the steps of iteratively receiving battery power level information from the battery module having the lowest maximum power capability and adjusting the charge current until the difference between the battery power level of the battery module having the lowest maximum power capability and the power threshold limit is within a predetermined limit value.

3. The method according to claim 2, further configured to receive battery parameter status for each of the at least two battery modules of the energy storage system, such as temperature, voltage, current, state-of-charge and state-of-health.

4. The method according to claim 3, wherein a memory unit is connected to the energy storage system, wherein the method further comprises the step of:
   providing information relating to battery parameter status and adjusted charge current to the memory unit.

5. The method according to claim 4, wherein the memory unit is a PID-regulator.

6. A control unit for controlling an energy storage system, wherein the energy storage system is connected to a generator and comprises at least two battery modules electrically coupled in parallel to each other, each of the at least two battery modules is connected to a measurement unit configured to measure a battery power level of the respective battery modules, wherein the control unit is configured to:
   receive a signal from each of the at least two battery modules, the signal being indicative of a maximum power capability of each of the respective battery modules;
   assign a power threshold limit for the at least two battery modules of the energy storage system corresponding to the lowest maximum power capability received from the battery modules; and
   control the generator to provide a charge current to the at least two batter modules, the charge current having a current level being proportional to the power threshold limit; and
   after controlling the generator to provide the charge current:
      receive a measured battery power level of the battery module having lowest maximum power capability;
      increase the charge current of each of the at least two battery modules of the energy storage system until a difference between the battery power level of the battery module having the lowest maximum power capability and the power threshold limit is within a predetermined limit after determining that a battery power level is below the power threshold limit; and
      discharge the battery charge level of each of the at least two battery modules of the energy storage system until a difference between the battery power level of the battery module having the lowest maximum power capability and the power threshold limit is within a second predetermined limit after determining that the battery power level is above the power threshold limit.

7. The control unit according to claim 6, wherein the control unit is further configured to monitor battery parameter status for each of the at least two battery modules of the energy storage system, such as temperature, voltage, current, state-of-charge and state-of-health.

8. The control unit according to claim 7, wherein the control unit is configured to adjust the charge current dependent on the monitored battery parameter status.

9. The control unit according to claim 8, wherein the control unit is further connected to a memory unit, wherein the memory unit is connected to the energy storage system and is configured to:
   receive and store information from each of the at least two battery modules relating to battery parameter status; and receive and store information from the control unit relating to adjustment of charge current provided to the at least two battery modules.

\* \* \* \* \*